March 20, 1962
J. H. BREMS
3,025,709
RECIPROCATING DRIVE MECHANISM
Filed June 23, 1960
3 Sheets-Sheet 1
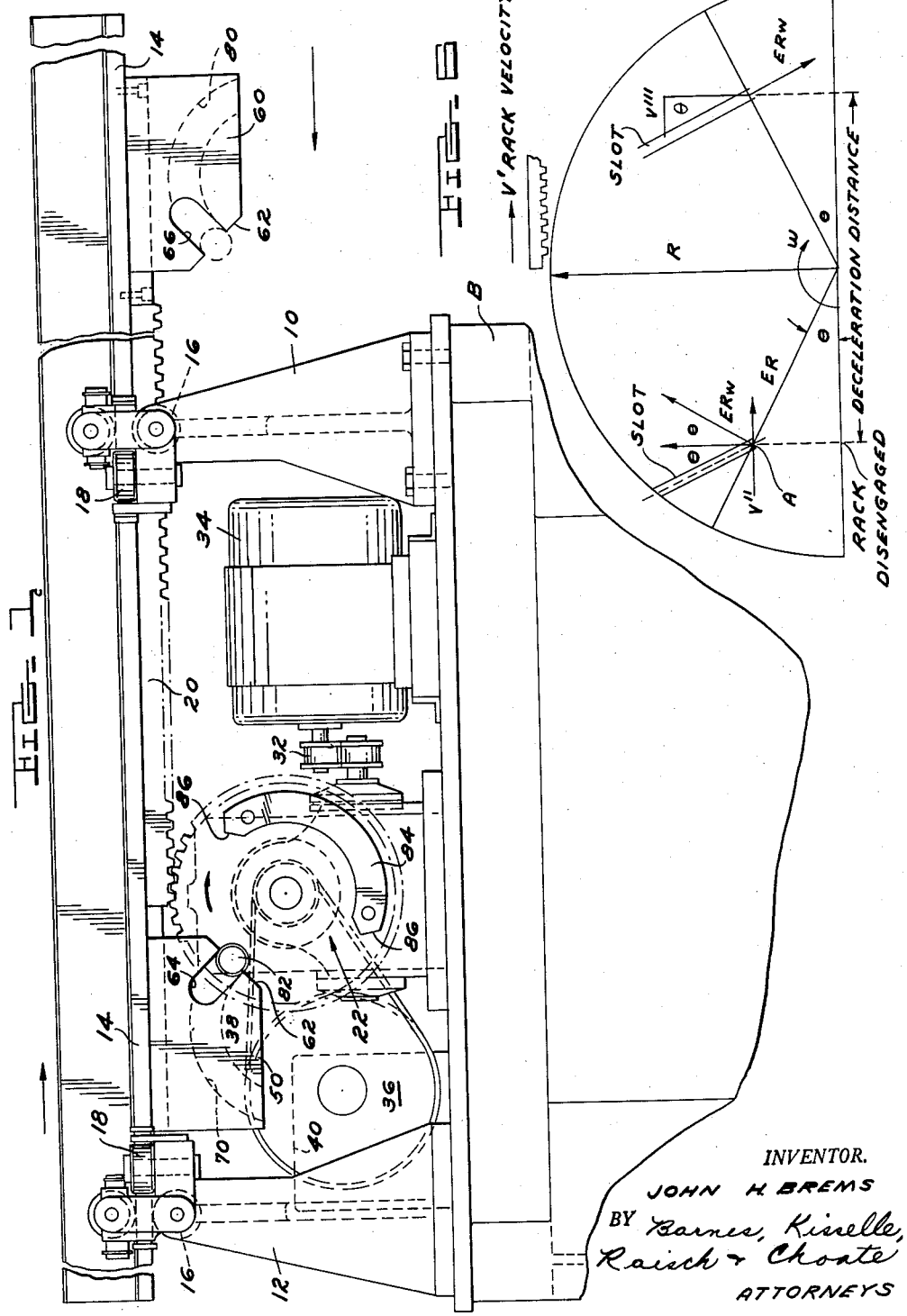
INVENTOR.
JOHN H. BREMS
BY Barnes, Kisselle,
Raisch & Choate
ATTORNEYS

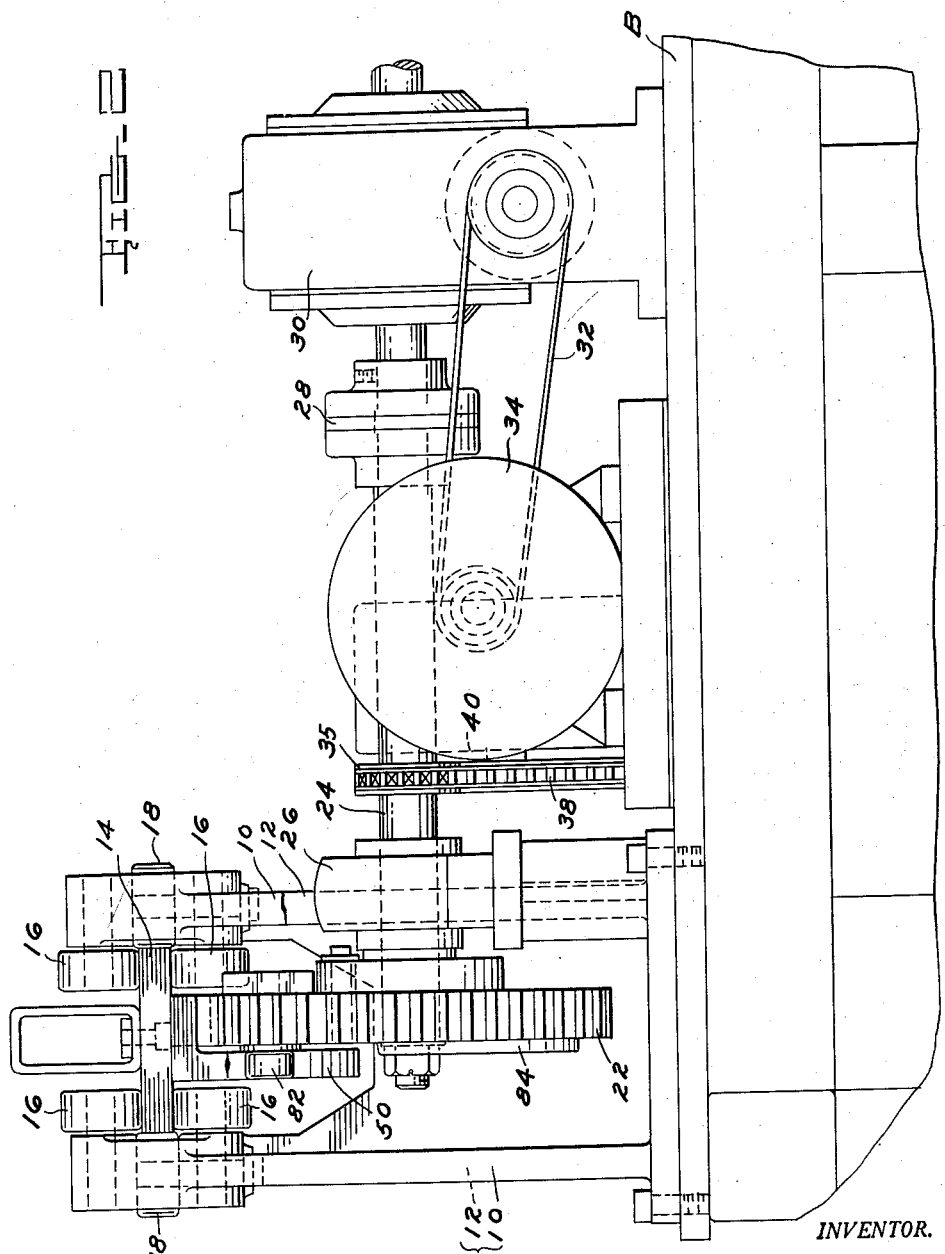

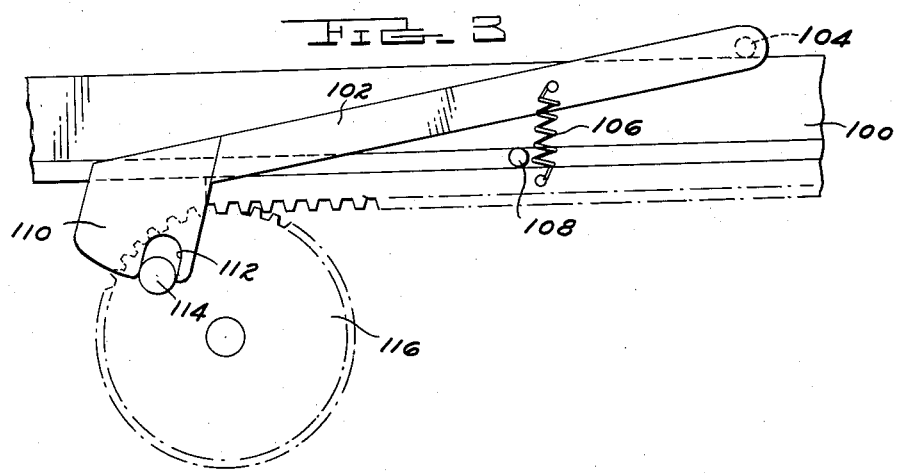
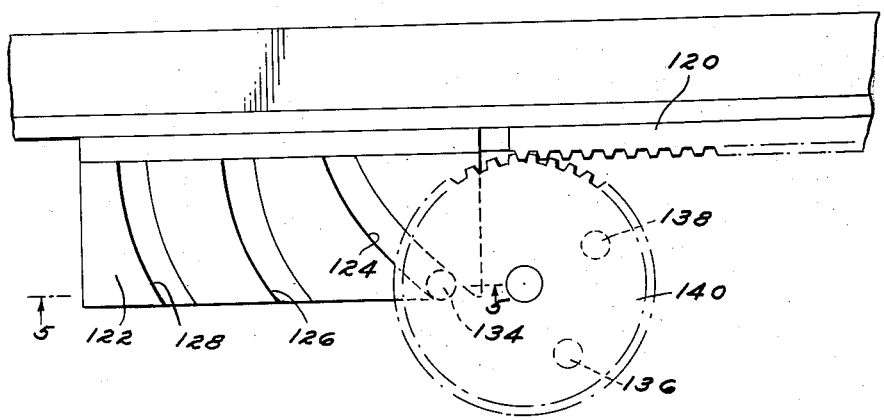
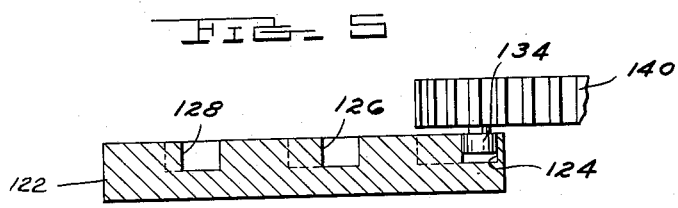
INVENTOR.
JOHN H. BREMS 3,025,709
Patented Mar. 20, 1962

3,025,709
RECIPROCATING DRIVE MECHANISM
John H. Brems, 18478 Westhampton, Southfield, Mich.
Filed June 23, 1960, Ser. No. 38,358
9 Claims. (Cl. 74—91)

This invention relates to a reciprocating drive mechanism.

It is an object of the present invention to provide a smooth shock-free starting and stopping action for a reciprocating table which has a defined straight path of travel.

It is an object to provide a mechanical accelerating and decelerating mechanism which is adaptable to varying strokes depending on the stroke desired and the length of the particular table in question.

It is a further object to provide a mechanism which not only has a decelerating device but has in cooperation therewith a positive stopping device which locates the table at the extreme ends of its stroke.

It is a further object to provide a deceleration device which operates to reduce the speed of the reciprocating mass to zero during the power cycle of the unit prior to the application of the brake to the prime mover. Thus the brake need only act against the rotating parts of the drive, the reciprocation of the table being fully arrested before the brake is applied.

Other objects and features of the invention relating to details of construction and operation will be apparent in the following description and claims.

Drawings accompany the disclosure and the various views thereof may be briefly described as:

FIGURE 1, a side elevation of the device illustrating the parts in their relative positions.

FIGURE 2, an end view of the device as shown in FIGURE 1.

FIGURE 3, a view of a modified mechanism for accomplishing the purpose defined.

FIGURE 4, a third modification of a mechanism for accomplishing the purpose of the invention.

FIGURE 5, a sectional view on line 5—5 of FIGURE 4.

FIGURE 6, a diagram of the mathematics of the action.

Referring to the drawings:

A machine base B has upright supporting brackets 10 and 12 at each end thereof for the support of a reciprocating table 14. The brackets 10 and 12 have suitable rollers 16 on a horizontal axis for supporting the table, and rollers 18 on a vertical axis on each side of the table for guiding the table in its path of travel.

It will be seen that on the bottom of the table is a rack 20 having equally spaced teeth suitably formed to mesh with a drive gear 22 mounted on a shaft 24 rotatably supported in a pillow block 26 on base B. The shaft 24 is driven through a coupling 28 from a gear reducer 30 powered by a belt 32 driven by a motor 34 also in base B. A sprocket 35 on shaft 24 drives a larger sprocket 36 through a chain 38. Sprocket 36 drives a limit switch device 40 for shutting off the motor and operating a dynamic power brake in connection with motor 34. Other brakes can be used if desired.

At each end of rack 20 on the table 14 are L-plates 50 and 60 securely bolted to the bottom of the table within the supporting brackets 10 and 12, FIGURE 2. Each depending plate 50 and 60 has a beveled corner 62 beveled at a suitable angle and facing each other and at this beveled corner are notches 64 and 66, respectively, extending at a suitable angle into the plates at the beveled corners. On the back of each plate is an arcuate face groove 70 and 80 respectively.

On the drive gear 22 is a roller stud 82 on the front face as viewed in FIGURE 1 arranged to cooperate with notches 64 and 66. Diametrically opposite the roller stud 82 is an arcuate segment plate 84 secured to the face of the gear 22, the plate having pointed ends 86. The plate occupies almost 180° on the gear.

As viewed in FIGURE 1, the rack is traveling to the right and the drive gear 22 is rotating in a clockwise direction. The roller pin 82 has just entered the slot 64 and the rack 20 is just about to leave the gear engagement. At this point the coupling or connection between the drive gear and the table is transferred to the roller stud 82 and slot 64. Even though the gear continues to rotate at constant angular velocity, the table is decelerated by the geometrical relationship between roller stud and slot. It will be seen that the roller stud moves up into the slot until it reaches top dead center and then it moves down out of the slot as it moves past top dead center. At the instant the roller leaves the slot after this sequence, the table will have been brought to a complete stop. At this same instant the segment plate 84 enters the arcuate fore groove 70 to lock the table in the end position and the motor and drive gear are stopped by the cam switch and brake. The motor and brake stop only the rotating mass rather than the reciprocating mass inasmuch as the reciprocating mass is stopped by the roller stud and slot geometrical relationship.

The angle of the slot on the plates 50 and 60 will depend on the position of the roller stud 82 radially on the drive gear. The proper relationship will exist when the horizontal relative velocity of the stud into the slot is zero at the point of entry of the stud into the slot. To accomplish this, the velocity of the rack as it disengages from the gear must equal the sum of (1) the horizontal component of the instantaneous velocity of the collar stud, plus (2) the horizontal velocity of the slot arising from the vertical (upward) component of the roller stud in the non-vertical slot (were the slot vertical this second component would be 0) which is equal to the roller stud vertical velocity times the tangent of the slot angle.

As viewed in FIGURE 6, the velocity of the rack is $V^1$. The slot is inclined $\theta$ degrees from vertical. Furthermore, the radius from the center of the gear to the center A of the roller stud makes an angle $\theta$ with the horizontal (theta is so defined to satisfy the exit condition as will be seen below). The pitch velocity of the gear is WR, that is, omega (angular gear velocity) times the radius. The center A of the roller pin has velocity of EWR, i.e., E (fraction of the radius) times the pitch velocity of the gear. The horizontal velocity component of the pin is therefore $EWR \sin \theta$. The slot component arising from the vertical velocity of the pin is equal to $EWR \cosine \theta \tan \theta$, which is the vertical component of the pin velocity ($EWR \cosine \theta$) times the tangent of $\theta$. So the total $V''=EWR \sin \theta + EWR \cos \theta \tan \theta$ which reduced $=2 EWR \sin \theta$. This must equal the pitch velocity of the gear, therefore, $WR=2EWR \sin \theta$, and reducing $$\sin \theta = \frac{1}{2E}$$

This sets up the relationship between the angle of the slot and the position of the pin on the radius of the drive gear. The deceleration distance equals 2ER times cosine $\theta$.

As the pin leaves the slot at the end of deceleration, the absolute velocity of the table is still equal to the sum of the horizontal component of the instantaneous velocity of the roller stud plus the horizontal velocity of the slot arising from the vertical (now downward) component of the roller stud in the non-vertical slot. In this case the respective values are $EWR \sin \theta$ and $-EWR$ cos θ tan θ = −EWR sin θ  Hence these two components cancel out exactly and the resultant slot and therefore table velocity is 0 as the collar stud leaves the slot. A detailed analysis of the kinetics of the system shows a relatively smooth deceleration of the table during the engagement of the collar stud in the slot.

During the deceleration motion the point 86 of the arcuate plate 84 is approaching the slot or face groove 70, FIGURE 1. As the pin 82 leaves the slot the plate 84 will enter the groove 70 to lock the shuttle in its extreme position. At the other end, plate 84 cooperates with groove 80.

At a convenient point in the cycle near the end of the deceleration of the table the sprocket 36 actuates the limit switch device 40 which serves to shut off the electric motor 34 and bring about dynamic power braking thereof. The point at which the switch 40 is actuated is not critical and the device allows for considerable latitude in stopping time for the motor 34. All that is necessary is that the motor come to a complete stop at some point when the arcuate segment plate 84 is engaged in the slot 70.

Thus the device provides an extremely simple and fool proof mechanical unit for accelerating and decelerating large masses or small, in any length stroke desired.

The device furthermore utilizes only standard spur gearing and special Geneva gearing of simple construction utilizing no parts which cannot be made easily on standard machine tools.

In FIGURE 3, I have shown a diagrammatic illustration of a modified mechanism for accomplishing the same purpose. On rack bar 100 is an arm 102 pivoted at 104. A spring 106 urges the arm downwardly against a stop 108. Arm 102 has a plate 110 with a notch 112 which cooperates with a roller pin 114 on drive gear 116. The operation of this device is similar to that described in FIGURES 1 and 2 with exception that arm 102 would move up slightly to compensate for the shifting pin 114.

In FIGURE 4, a second modification is shown wherein a rack bar 120 has a slotted plate 122 with progressively curved slots 124, 126, 128, which cooperate respectively with roll pins 134, 136 and 138 on drive gear 140. Deceleration progresses as before, each pin picking up as the preceding pin leaves its respective slot. The last pin 138 brings the rack to a complete stop.

In each case the deceleration of the reciprocating member is accomplished while the drive gear is rotating at a constant speed and any load due to the inertia forces is absorbed by the motor. The motor may still be operating at running speed when the reciprocating mass has zero velocity and at this time the dynamic brake is actuated to check the speed of the motor and the drive gear to zero.

I claim:

1. In a reciprocal motion mechanism, a reversible rotating drive member having a constant operating speed, a reciprocable unit to be driven by said member, means connecting said member and said unit for the major portion of the reciprocal stroke at constant speed, and means connecting said member and said unit at the ends of the stroke to accelerate and decelerate the unit while said member rotates at operating speed, and in which means on said unit and means on said member couple rotatively at the stop position of said unit to lock said unit in a fixed position until said member is reversed.

2. A device for moving a work table of a machine which comprises, a support, a table slidable reciprocably on said support, a rack on said table extending approximately the length of the stroke to be imparted to the table, a gear engageable with said rack to drive the rack reciprocably, power means to drive said gear, means to brake said gear, and means to provide an acceleration and deceleration mechanism for said rack and said gear comprising a plate on said table at each end of said rack, said plates lying in the same plane, and parallel and adjacent the plane of said gear, each plate having a slot disposed with an end open to the rack side of said table, and a projecting pin on the face of said gear offset from the center thereof positioned relative to said slot to enter said slot as said gear disengages from said rack wherein decelerating force is directly exerted on said table as said gear continues to rotate, and in which each of said plates has an arcuate slot on one surface thereof, and an arcuate segment is mounted on the face of said gear positioned to enter said slot as said table comes to a stationary position, said parts cooperating to lock said table until said gear is operated in the opposite direction.

3. A device for moving a worktable of a machine in a reciprocating path with a smooth acceleration and deceleration motion at each end which comprises, a table mounted for reciprocal movement, a rack on said table extending approximately the length of the stroke to be imparted to the table, a gear mounted for rotation adjacent said table having teeth engageable with said rack to drive the rack reciprocably, power means to drive said gear in forward and back directions, means to brake said gear at the end of each stroke of said table and means to provide an acceleration and deceleration for said rack comprising means forming an engagement slot at each end of said table, means on said gear positioned between the center and the outer periphery thereof to engage said slot as said gear rotates out of engagement with said rack at either end of said table wherein accelerating and decelerating force on said table result from normal rotation of said gear, and in which a locking means is associated with said gear comprising an arcuate bar on one surface of said gear and an arcuate groove on said table at each end thereof, said bar entering said groove at the end of a stroke of said table to lock the table in position until further rotation of said gear.

4. A device for moving a worktable of a machine which comprises, a support, a table slidable reciprocably on said support, a rack on said table extending approximately the length of the stroke to be imparted to the table, a gear engageable with said rack to drive the rack reciprocably, power means to drive said gear, means to brake said gear, and means to provide an acceleration and deceleration mechanism for said track and said gear comprising a plate on said table at each end of said rack, said plates lying in the same plane, and parallel and adjacent the plane of said gear, each plate having a slot disposed with an end open to the rack side of said table, and a projecting pin on the face of said gear offset from the center thereof positioned relative to said slot to enter said slot at the end of a stroke as said gear disengages from said rack wherein decelerating force is directly exerted on said table as said gear continues to rotate, said slot end being inclined at a predetermined angle with respect to the path of the driven member such that the pin enters the slot with a generally circumferential travel at zero relative velocity and leaves the slot with a generally radial travel at zero relative velocity during an acceleration of the driven member and enters and leaves the slot with the converse travel during deceleration.

5. In a compound gearing for connecting a rotary driving member with a driven member to produce successive cycles of acceleration, fixed ratio drive, and deceleration, of the driven member and which has driving and driven spur gearing associated with the respective members to be engaged during the fixed ratio phase of the cycle and to be interrupted during the accelerating and decelerating phases of the cycle and which has separate Geneva gearing devices engaging the driving member with the driven member for acceleration and deceleration, that improvement in which the Geneva gearing comprises a stud on the driving member rotatable in an arc which is tangent to the travel of a part of the driven member and a slot on said part having one open end forming both an entrance and an exit for the stud, said slot end being inclined at a predetermined angle with respect to the path of the driven member such that the stud enters the slot with a generally circumferential travel and leaves the slot with a generally radial travel during an acceleration of the driven member and enters and leaves the slot with the converse travel during deceleration.

6. A device according to claim 5 having an arcuate recess on said part and a locking segment rotatable with the driving member to engage the recess while the driven member is stopped.

7. A device according to claim 5 having means for stopping the driving member after the driven member has stopped whereby latitude in the stopping position of the driving member under various conditions does not alter the stopping position of the driven member.

8. A device according to claim 5 in which the angle "$\theta$" which the slot end makes with a radius of the driving gear at the meshing point and the ratio "E" of the radius of action of the stud to the pitch radius of the spur gear meet substantially the relation: Sine $\theta = \frac{1}{2}E$.

9. A device according to claim 5 in which the driven member comprises a straight rack and the Geneva gearing comprises a pair of plates one at each end of the rack and each carrying an inclined slot and an arcuate recess for cooperation with a common stud and a common segment on the driving spur gear.

References Cited in the file of this patent

UNITED STATES PATENTS

| | | |
|---|---|---|
| 688,547 | Read | Dec. 10, 1901 |
| 961,206 | Brower | June 14, 1910 |
| 2,082,184 | Seybold | June 1, 1937 |
| 2,918,828 | Dexter | Dec. 29, 1959 |